United States Patent
Sakai

(10) Patent No.: US 7,950,749 B2
(45) Date of Patent: May 31, 2011

(54) VEHICLE CONTROL APPARATUS AND VEHICLE CONTROL METHOD

(75) Inventor: Akira Sakai, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 291 days.

(21) Appl. No.: 11/677,715

(22) Filed: Feb. 22, 2007

(65) Prior Publication Data

US 2007/0200424 A1 Aug. 30, 2007

(30) Foreign Application Priority Data

Feb. 27, 2006 (JP) ................................. 2006-050678

(51) Int. Cl.
*B60T 8/56* (2006.01)
(52) U.S. Cl. ........................... 303/142; 303/191; 303/89
(58) Field of Classification Search .................. 303/191, 303/142, 89, 192, 24.1
See application file for complete search history.

(56) References Cited

U.S. PATENT DOCUMENTS

| | | | |
|---|---|---|---|
| 6,193,332 B1 * | 2/2001 | Ono ............................... | 303/191 |
| 6,332,654 B1 * | 12/2001 | Yano ............................... | 303/89 |
| 2003/0119628 A1 * | 6/2003 | Jager et al. ...................... | 477/71 |
| 2003/0184151 A1 * | 10/2003 | Mueller et al. ................. | 303/138 |
| 2005/0017580 A1 * | 1/2005 | Cikanek et al. ................ | 303/191 |
| 2007/0114841 A1 * | 5/2007 | Maruyama et al. ............ | 303/89 |

FOREIGN PATENT DOCUMENTS

| | | |
|---|---|---|
| CN | 1572578 A | 2/2005 |
| DE | 101 21 158 A1 | 11/2001 |
| JP | 54013133 A | 1/1979 |
| JP | 58-075163 | 5/1983 |
| JP | 59-110346 | 7/1984 |
| JP | 63-154453 A | 6/1988 |
| JP | 05-310119 | 11/1993 |
| JP | 11-247675 A | 9/1999 |
| JP | 11-348607 | 12/1999 |
| JP | 2000-127927 | 5/2000 |
| JP | 2000-313253 A | 11/2000 |
| JP | 2001-003778 | 1/2001 |
| JP | 2001-355481 | 12/2001 |
| JP | 2005-297964 | 10/2005 |
| JP | 2005-306374 | 11/2005 |

OTHER PUBLICATIONS

Japanese Report of Result of Reconsideration Before Appeal with English translation issued Oct. 15, 2010 in connection with Japanese Application No. JP 2006-050678. (5 pages).

* cited by examiner

*Primary Examiner* — Melanie Torres Williams
(74) *Attorney, Agent, or Firm* — Oblon, Spivak, McClelland, Maier & Neustadt, L.L.P.

(57) ABSTRACT

In a vehicle control apparatus, a hybrid ECU automatically stops and starts an engine if a predetermined condition is met while the vehicle is stopped. A brake ECU controls the braking force applied to wheels. A hybrid ECU controls the brake ECU so that braking force is applied to the wheels at the time of startup of the engine if while the vehicle is stopped, the vehicle run position is not selected as a shift position of the transmission. This restrains vibration of the vehicle at the time of startup of the engine.

21 Claims, 8 Drawing Sheets

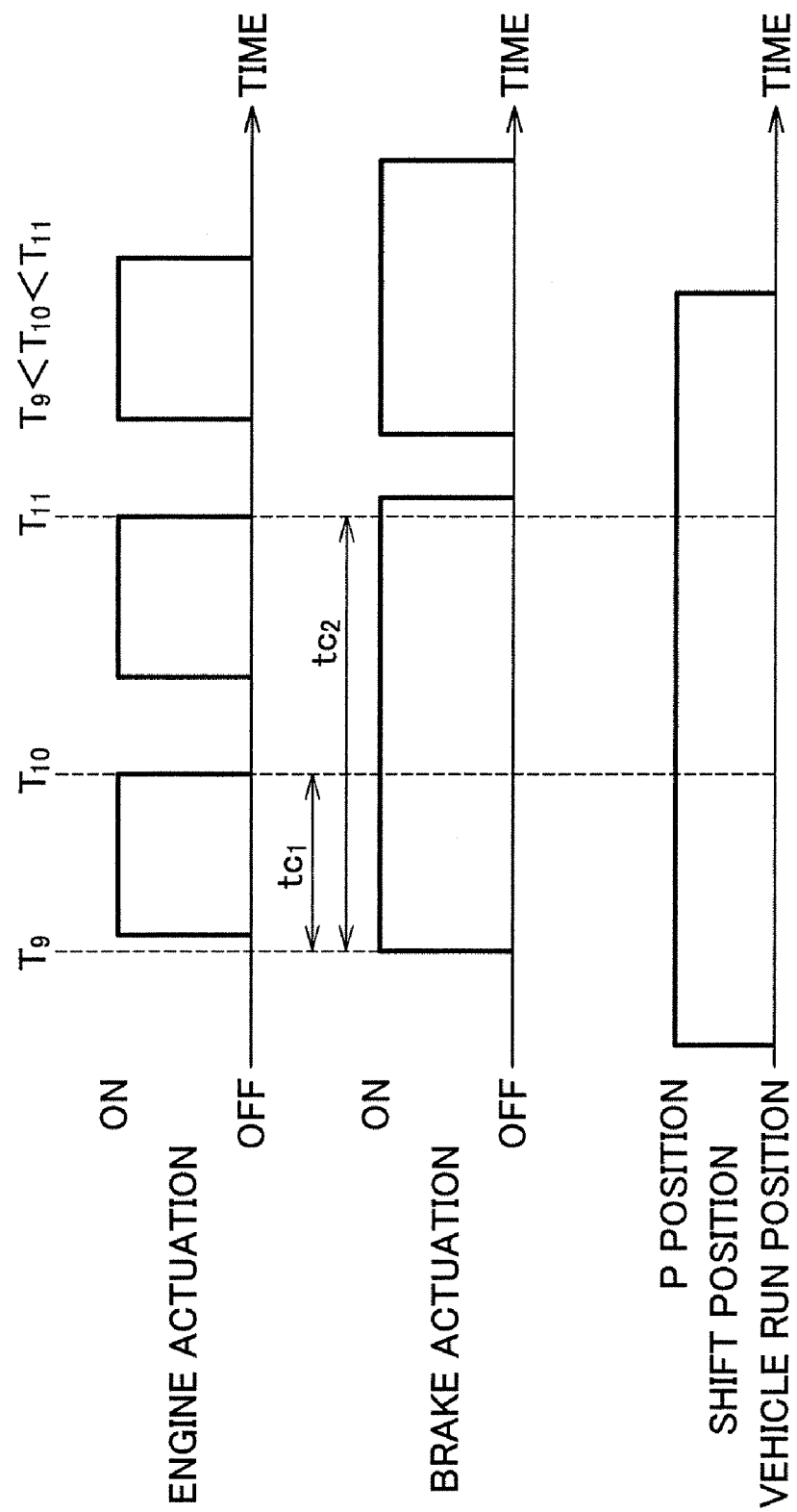

VEHICLE CONTROL APPARATUS AND VEHICLE CONTROL METHOD

INCORPORATION BY REFERENCE

The disclosure of Japanese Patent Application No. 2006-050678 filed on Feb. 27, 2006 including the specification, drawings and abstract is incorporated herein by reference in its entirety.

BACKGROUND OF THE INVENTION

1. Field of the Invention

The invention relates to a vehicle control apparatus and method for controlling operation of a vehicle, more particularly, a hybrid vehicle combining an electric motor and an internal combustion engine.

2. Description of the Related Art

A so-called hybrid system in which an electric motor and an internal combustion engine as drive sources of a vehicle are combined is conventionally known. In the hybrid system, a control of stopping the driving of the engine under a predetermined condition in order to achieve improved fuel economy and reduced exhaust gas is sometimes performed. From such a situation where the engine is stopped, a control of restarting the driving of the engine under a predetermined condition is also performed.

For example, Japanese Patent Application Publication No. JP-A-11-348607 discloses a construction of an automatic stop-restart apparatus of automatically stopping and restarting an engine in a predetermined condition which comprises: wheel hold means for restraining rotation of a wheel of a vehicle during an automatic stop; and wheel hold continuation means for continuing maintenance of a braking force by the wheel hold means when the engine is restarted in a certain condition apart from a purpose of running the vehicle while the shift position of the transmission is a vehicle run position and the engine is at an automatic stop.

Furthermore, Japanese Patent Application Publication No. JP-A-2005-306374 discloses a construction of a vehicle control apparatus equipped with a drive source control device that automatically stops and restarts an engine, in which when the state of manipulation of a shift manipulation device is changed from a non-driving state to a driving state and a drive source is restarted, either the control of the braking force or the restart control of the drive source is performed on the basis of a result of comparison between the drive force of the engine and the braking force applied to the vehicle.

As described above, in some hybrid systems, when the shift position is not the vehicle run position, for example, is the parking position (hereinafter, referred to as "P position"), the engine is automatically stopped in order to reduce the fuel consumption and reduce the emission.

If during this state, electric components, such as, an air-conditioner, a stereo, etc., continue to be used, the state of charge of the battery declines; therefore, the engine is started in order to charge the battery. After this charging recovers the charged state of the battery, the engine is stopped again. Hence, the entire vehicle may vibrate in association with the starting and the stopping of the engine. In particular, when the vehicle is parked with the P position selected, it is often the case that the driver is not applying braking force to the vehicle, and therefore the vehicle is likely to vibrate at the time of starting or stopping the engine. Besides, since such vibration of the vehicle occurs not during running of the vehicle, but during a stop thereof, the vibration is likely to cause unpleasant feeling to occupants.

However, in the aforementioned related-art technologies, there is no consideration regarding the vibration of the vehicle caused when the engine is started with the shift position not being the vehicle run position but being the P position.

SUMMARY OF THE INVENTION

The invention provides a vehicle control apparatus and method which restrain vibrations of the vehicle when a drive source is started while the vehicle is at a stop with a vehicle non-run position of a transmission being selected.

A vehicle control apparatus in accordance with a first aspect of the invention, comprises a drive source control device that automatically stops and starts a drive source if a predetermined condition is met while the vehicle is stopped, and a braking force control device that controls a braking device to apply a braking force to a wheel. The braking force control device controls the braking device so that the braking force is applied to the wheel when the drive source is started if a vehicle non-run position is selected, i.e., a vehicle run position is not selected, as a shift position of a transmission while the vehicle is stopped.

According to the first aspect, when a hybrid vehicle is stopped, for example, the drive source control device may automatically starts the drive source, such as an engine or the like, in order to generate electricity in a condition where the state of charge of a battery has declined due to the use of electric components or the like. Normally, if a vehicle run position has not been selected as a shift position of the transmission, for example, if a parking position as a vehicle non-run position has been selected, the driver is not manipulating the brake in some cases. In such a case, the startup of the drive source may cause vibration of the vehicle. Therefore, if the vehicle is stopped and the vehicle run position is not selected, i.e., the vehicle non-run position being selected, vibration of the vehicle at the time of startup of the drive source can be restrained if the braking device is controlled to apply a braking force to the wheel when the drive source is started. The braking force control device controlling the braking device may be controlled by the drive source control device. In other words the drive source control device may be configured to automatically stop and start the drive source if a predetermined condition is met while the vehicle is stopped, and to control the braking force control device to control the braking device to apply a braking force to the wheel while the vehicle is stopped and the drive source is started. It should be noted, however, that in an alternative embodiment of the present invention the control functions of the braking force control device and drive source control device may be implemented by independent control devices communicating with each other, or may implemented by a single control device.

The braking force control device may control the braking device so that the braking force applied to the wheel when the drive source is started is maintained during a period when the vehicle non-run position is selected. If a predetermined condition for stopping the drive source is met a plurality of times during a period when the vehicle non-run position is selected, i.e., the vehicle run position is not selected, the action of applying braking force to the wheel via a braking device, such as a brake or the like, is performed a plurality of times. Every time the action is performed, actuation sounds are produced from movable portions, such as a valve, a pump, etc., which constitute the brake, that is, a braking device. In this respect, the vehicle control apparatus is capable of reducing the frequency of the brake action of applying braking force to the wheel by controlling the braking force control device so that the braking force applied to the wheel at the time of startup of the drive source is maintained during the period when the vehicle run position is not selected. Therefore, the occurrence of actuation sounds will be restrained so that quietness will improve, and the abrasion and sliding of movable portions will be reduced so that the service life of the brake will increase.

The driving source control device may control the braking force control device so that the braking force is removed if a time during which the braking force is maintained exceeds a predetermined time during the period when the vehicle non-run position is selected, i.e., when the vehicle run position is not selected. Some oil pressure brakes and the like used as a braking device employ a valve whose open or closed state is maintained by electrification. As for such a brake, an event can be assumed in which if braking force continues to be applied to the wheel, the overheating of the valve results due to the current continuously flowing through the valve. Therefore, if during the period when the vehicle run position is not selected, the time during which braking force is maintained exceeds a predetermined time, the overheating of the valve can be restrained by removing the braking force.

The braking force control device may control the braking device so as to maintain the braking force applied to the wheel until after a time at which the drive source is again stopped, if the vehicle non-run position of the transmission is selected while the vehicle is stopped. In other words, a timing of removal of the braking force may be in a period when the drive source is stopped. Therefore, since braking force is not removed during the period when the drive source is driven, the occurrence of vibration of the vehicle caused by the driving of the drive source can be restrained.

The braking device may include a hydraulic braking unit and at least one other braking device for applying a braking force to the wheel. In this case, the braking force control device may control the hydraulic braking unit so as to apply a braking force to the wheel when the drive source is started, only if the at least one other braking device is not actuated. In other words, the braking force control device does not perform the control of applying braking force to the wheel via an oil pressure brake at the time of starting the drive source if braking force has been applied to the wheel via a braking device other than the hydraulic braking unit (oil pressure brake). Therefore, for example, if braking force has been applied to the wheel beforehand via an electric or manual parking brake, braking force is not additionally applied by the oil pressure brake. Therefore, the actuation sounds produced from movable portions at the time of actuation of the oil pressure brake will reduce, and the abrasion and sliding of movable portions will reduce so that the service life of the oil pressure brake will increase.

A second aspect of the invention relates to a vehicle control method for controlling operation of a vehicle having a drive source for producing a drive force, a braking device for applying a braking force to a wheel of the vehicle, and a transmission having a plurality of shift positions including a vehicle run position in which a drive force is applied to the wheel and a vehicle non-run position in which a drive force is not applied to the wheel. The vehicle control method comprises the steps of: automatically stopping and starting the drive source if a predetermined condition is met while the vehicle is stopped; and controlling the braking device to apply a braking force to the wheel when the drive source is started if a vehicle non-run position of the transmission is selected while the vehicle is stopped.

A vehicle control apparatus in accordance with a third aspect of the invention comprises a drive source control device that automatically stops and starts a driving source in a predetermined condition is met while the vehicle is stopped, and a braking force control device that controls a braking force applied to a wheel. The drive source control device controls the braking force control device so that the braking force is applied to the wheel when the drive source is started if a vehicle run position is not selected as a shift position of a transmission while the vehicle is stopped.

According to the above-mentioned aspects of the invention, if the vehicle is at a stop with the vehicle run position not being selected, vibration of the vehicle at the time of startup of the drive source can be restrained.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 8 is a timing chart of the engine actuation, the brake actuation, and the shift position in accordance with the third embodiment.

DETAILED DESCRIPTION OF THE PREFERRED EMBODIMENTS

Hereinafter, preferred embodiments of the invention will be described with reference to the drawings.

First Embodiment

Figure 1:
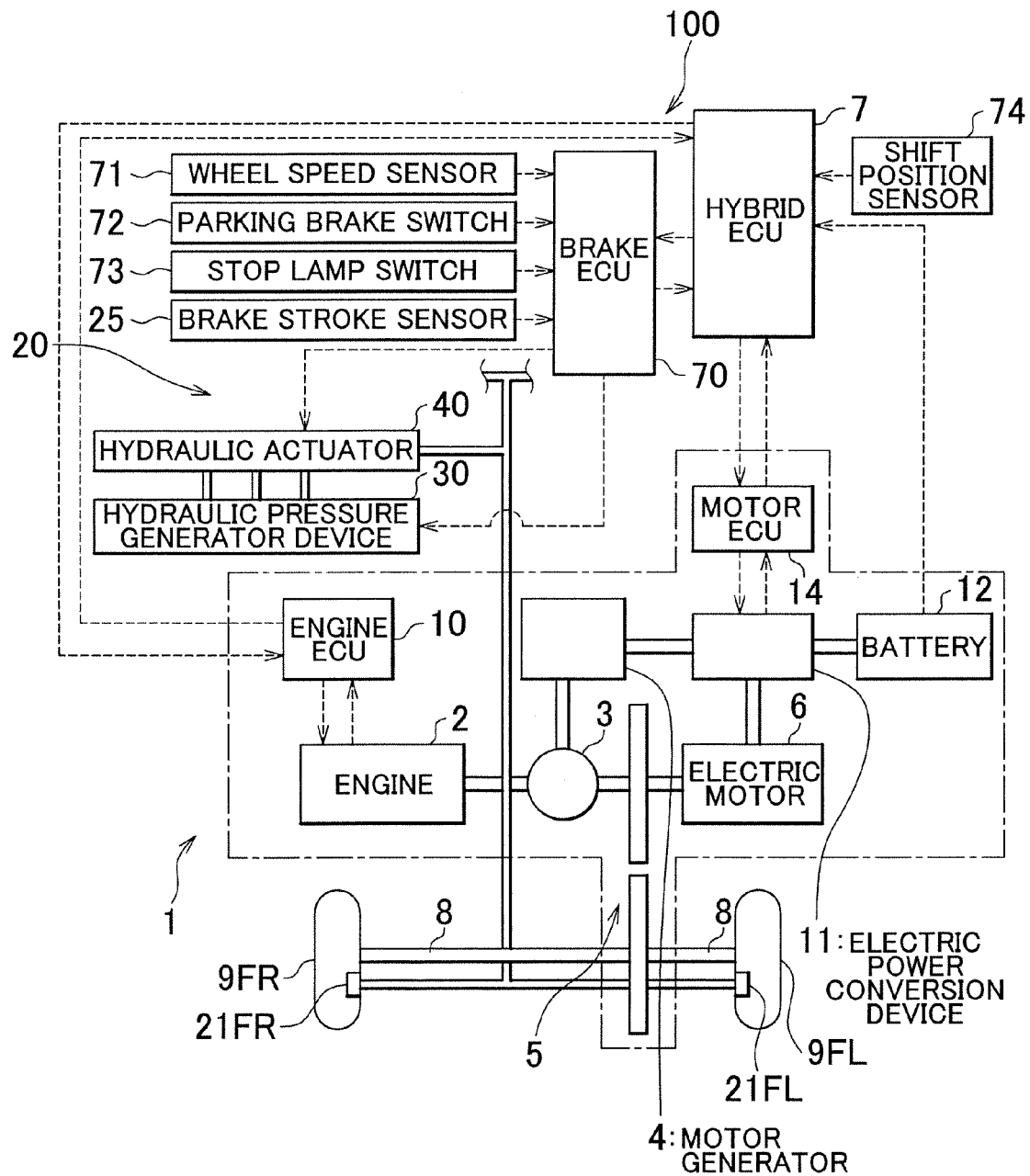
FIG. 1 is a schematic construction diagram showing a vehicle to which a vehicle control apparatus in accordance with an embodiment of the invention is applied.

FIG. 1 is a schematic construction diagram showing a vehicle to which a vehicle control apparatus in accordance with an embodiment of the invention is applied. A vehicle 1 shown in FIG. 1 is constructed as a vehicle adopting a so-called hybrid system, and comprises: an engine 2 as a drive source, a three-axis power splitting mechanism 3 connected to a crankshaft that is an output shaft of the engine 2, a motor generator 4 connected to the power splitting mechanism 3 and being capable of generating electric power, an electric motor 6 connected to the power splitting mechanism 3 via a transmission 5, and a hybrid-purpose electronic control unit (hereinafter, referred to as "hybrid ECU" with the electronic control unit being always termed "ECU") 7 that controls the entire drive system of the vehicle 1. A front right wheel 9FR and a front left wheel 9FL as drive wheels of the vehicle 1 are linked to the transmission 5 via a drive shaft 8.

The engine 2 is, for example, an internal combustion engine that is operated through the use of a hydrocarbon-based fuel, such as gasoline, light oil, etc., and is controlled by an engine ECU 10. The engine ECU 10 is capable of communicating with the hybrid ECU 7, and executes a fuel injection control, an ignition control, an intake control, etc., of the engine 2 on the basis of a control signal from the hybrid ECU 7, and signals from various sensors that detect states of actuation of the engine 2. Besides, the engine ECU 10 gives information regarding the state of actuation of the engine 2 to the hybrid ECU 7 in accordance with need.

The power splitting mechanism 3 plays the role of transferring the output of an electric motor 6 to a front right wheel 9FR and a front left wheel 9FL via the transmission 5, the role of distributing the output of the engine 2 to the motor generator 4 and to the transmission 5, and the role of decreasing or increasing the rotation speed of the electric motor 6 or the engine 2.

The motor generator 4 and the electric motor 6 are connected to a battery 12 via an electric power conversion device 11 that includes inverters. A motor ECU 14 is connected to the electric power conversion device 11. The motor ECU 14 is also capable of communicating with the hybrid ECU 7, and controls the motor generator 4 and the electric motor 6 via the electric power conversion device 11 on the basis of the control signal from the hybrid ECU 7, and the like.

Incidentally, each of the hybrid ECU 7, the engine ECU 10 and the motor ECU 14 mentioned above is constructed as a microprocessor that includes a CPU. Besides the CPU, each ECU is equipped with a ROM that stores various programs, a RAM for temporarily storing data, input/output ports, communication ports, etc. In addition, the hybrid ECU 7 is also equipped with a shift position sensor 74 that detects whether the shift position of the transmission 5 is a vehicle run position or a vehicle non-run position. It is to be noted herein that the shift position of the transmission 5 refers to a D position that is selected for normal running of the vehicle, a B position that is selected for engine brake or the like, a R position that is selected for reversing, a P position that is selected while the vehicle is stopped or parked, a N position, etc. In this embodiment, the vehicle run position refers to a position selected for the running of the vehicle, such as the D position, the B position, the R position, etc., whereas the vehicle non-run position refers to a position selected if the running of the vehicle is not intended. The case where the vehicle non-run position is selected, i.e. where the vehicle run position is not selected, refers to, for example, the case where the P position or the N position is selected. In the description of embodiments below, the case where the vehicle non-position is selected, i.e., where the vehicle run position is not selected, is the case where the P position is selected. However, the embodiment can be applied substantially in the same manner also in the case where the N position is selected.

The front right wheel 9FR and the front left wheel 9FL can be driven by the output of the electric motor 6 through supplying the electric power to the electric motor 6 from the battery 12 via the electric power conversion device 11 under the control of the hybrid ECU 7 and the motor ECU 14. In an operation region where the engine efficiency is good, the vehicle 1 is driven by the engine 2. On this occasion, a part of the output of the engine 2 can be transferred to the motor generator 4 via the power splitting mechanism 3, so that the electric power generated by the motor generator 4 can be used to drive the electric motor 6 or charge the battery 12 via the electric power conversion device 11.

Furthermore, at the time of braking the vehicle, the power transferred from the front right wheel 9FR and the front left wheel 9FL is used to rotate the electric motor 6, so that the electric motor 6 is caused to act as an electric generator, under the control of the hybrid ECU 7 and the motor ECU 14. That is, the electric motor 6, the electric power conversion device 11, the hybrid ECU 7, the motor ECU 14, etc., function as a regenerative brake unit that brakes the vehicle 1 by regenerating electric energy from kinetic energy of the vehicle 1.

A vehicle braking device in accordance with this embodiment is equipped with a hydraulic brake unit 20 (oil pressure brake) in addition to the above-described regenerative brake unit, and is able to brake the vehicle 1 by executing a brake regeneration cooperative control of causing the two units to cooperate. The hydraulic brake unit 20 includes disc brake units 21FR, 21FL provided respectively for the front right wheel 9FR and the front left wheel 9FL, disc brake units (not shown) provided respectively for rear right and left wheels, a hydraulic pressure generator device 30 that serves as a supply source of a brake oil as a working liquid for each disc brake unit, and a hydraulic actuator 40 capable of setting a braking force for each wheel of the vehicle 1 by appropriately adjusting the hydraulic pressure of the brake oil from the hydraulic pressure generator device 30 and supplying it to each disc brake unit.

The hydraulic pressure generator device 30 includes a booster, a master cylinder, a regulator, a reservoir, an accumulator, and a pump (which are not shown). The booster is linked to a brake pedal (not shown), and amplifies the pedal depressing force applied to the brake pedal and transfers it to the master cylinder. Then, the master cylinder generates a master cylinder pressure that has a predetermined servo ratio with respect to the pedal depressing force.

The hydraulic actuator 40 includes an actuator block in which a plurality of fluid passageways are formed, and a plurality of electronic control valves. An intermediate portion of each of the fluid passageways is provided with a pressure-intensifying control valve. Each pressure-intensifying control valve has a solenoid that is on-off controlled, and a spring, and is of a normally open-type electronic control valve that is open when the solenoid is in a non-electrified state.

Furthermore, each disc brake unit is connected to a pressure-reduction passageway. An intermediate portion of each pressure reduction passageway is provided with a pressure reduction control valve. Each pressure reduction control valve has a solenoid that is on-off controlled, and a spring, and is of a normally closed-type electronic control valve that is closed when the solenoid is in the non-electrified state.

The hydraulic pressure generator device 30 and the hydraulic actuator 40 constructed as described above are controlled by the brake ECU 70 provided as a control means. The brake ECU 70 is also constructed as a microprocessor that includes a CPU. Besides the CPU, the ECU 70 is equipped with a ROM, a RAM for temporarily storing data, input/output ports, communication ports, etc. Furthermore, the brake ECU 70 is capable of communicating with the hybrid ECU 7, and controls the pump of the hydraulic pressure generator device 30, and the electronic control valve that constitutes the hydraulic actuator 40, on the basis of signals from the various sensors and switches.

As shown in FIG. 1, the sensors connected to the brake ECU 70 include a wheel speed sensor 71, a parking brake switch 72, and a stop lamp switch 73. The wheel speed sensor 71 detects the wheel speed of each wheel. The parking brake switch 72 detects whether or not the parking position has been selected as a shift position. The stop lamp switch 73 outputs the on/off-state of the brake pedal.

The detection values from the sensors and switches are serially given to the brake ECU 70 at every predetermined time, and are stored and retained in a predetermined storage region (buffer) in the brake ECU 70 in a predetermined amount at a time.

The sensors connected to the brake ECU 70 further include a brake stroke sensor 25. The brake stroke sensor 25 detects the amount of manipulation of the brake pedal, and gives a signal indicating the detected value, to the brake ECU 70. The detection value from the brake stroke sensor 25 is also serially given to the brake ECU 70 at every predetermined time, and is stored and retained in a predetermined storage region (buffer) in the brake ECU 70 in a predetermined amount at a time.

In this embodiment, the hybrid ECU 7 functions as a drive source control device that automatically stops and starts a drive source while the vehicle is stopped, in a predetermined condition, for example, when the state of charge of the battery 12 is at a predetermined value. Besides, the brake ECU 70 functions as a braking force control device of controlling the braking force applied to wheels. Although in the embodiment, the hybrid ECU 7 performs a stop-start control of the engine 2 via the engine ECU 10, the hybrid ECU 7 may also perform the functions as an engine ECU 10 to directly stop and start the engine 2. It is also possible to employ an ECU that performs the functions of the hybrid ECU 7 and the functions of the brake ECU 70.

Brake Actuation Control at Time of Stop

In the vehicle 1 adopting the hybrid system as described above, if during a stop of the vehicle, the shift position is not the vehicle run position, but is, for example, the P position, the engine 2 is automatically stopped in order to reduce the fuel consumption and reduce the emission. If while the vehicle is stopped, an electric component, such as an air-conditioner, a stereo, etc., continues to be used, the state of charge (SOC value) of the battery 12 declines, and therefore the engine 2 is started in order to charge the battery 12.

When the engine 2 is started and stopped in this manner, vibration is likely to occur in the vehicle 1. In order to restrain the vibration, the vehicle control apparatus 100 in accordance with this embodiment performs a brake actuation so as to apply braking force to the wheels at predetermined timing.

Figure 2:
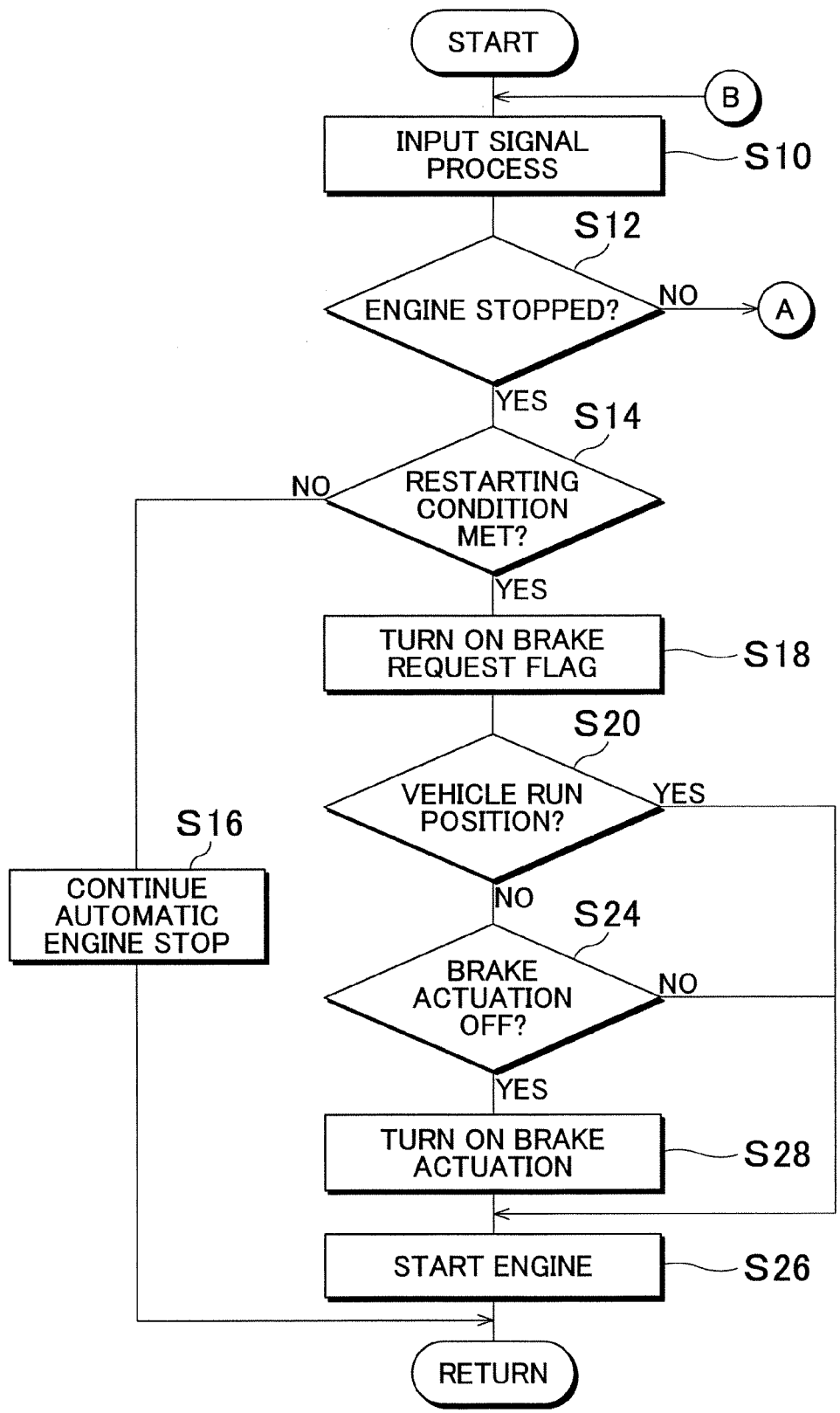
FIG. 2 is a flowchart illustrating a brake actuation control in accordance with the first embodiment.

FIG. 2 is a flowchart illustrating a brake actuation control in accordance with the first embodiment. This process may be started, for example, if it is judged that the vehicle 1 is at a stop, from the detection value from the wheel speed sensor 71.

When the process is started, various input signals indicating states of the vehicle are processed (S10). Then, on the basis of the input signals, it is determined whether or not the engine 2, which is a drive source and a vibration-generating factor, is at a stop (S12). If the engine 2 is not at a stop (NO at S12), the process switches to an engine stop condition determining process A described below.

If the engine 2 is at a stop (YES at S12), it is determined whether or not a condition for restarting the engine 2 is met (S14). In this embodiment, it is determined whether or not the state of charge of the battery 12 is less than a predetermined control value. Specifically, the SOC value (State of Charge), which indicates the state of charge, is detected. On the basis of the information, the hybrid ECU 7 determines whether or not to restart the engine 2.

In this embodiment, if the SOC value is greater than or equal to a predetermined control value, it is determined that the condition of restarting the engine 2 is not met (NO at S14), and the engine automatic stop is continued (S16). On the other hand, if the SOC value is less than the predetermined control value, it is necessary to cause the motor generator 4 to generate electricity in order to charge the battery 12. In this case, the engine 2 needs to be driven in order provide power for the motor generator 4, and therefore, it is determined that the condition for restarting the engine 2 has been met (YES at S14).

The vehicle sometimes vibrates when the engine 2 is restarted. Therefore, if the condition for restarting the engine 2 is met, the hybrid ECU 7 is caused to turn on the brake request flag (S18), and transmits the information to the brake ECU 70. Furthermore, the hybrid ECU 7 detects information regarding the shift position of the transmission 5 from the shift position sensor 74, and transmits the information to the brake ECU 70. The brake ECU 70 detects information regarding whether or not the shift position is the P position from the parking brake switch 72.

In this embodiment, it is determined whether or not the vehicle run position has been selected (S20) on the basis of information regarding the shift position detected by the parking brake switch 72 and the shift position sensor 74.

For example, if the D position, that is, a vehicle run position, has been selected (YES at S20), the vehicle is expected to run afterwards, and therefore there is no need for consideration of vibration of the vehicle in conjunction with restart of the engine 2. Therefore, the brake ECU 70 does not perform the brake actuation control based on the brake request flag, but the hybrid ECU 7 performs a restart control of the engine 2 (S26). On the other hand, if the P position, which is not a vehicle run position but a vehicle non-run position, has been selected (NO at S20), it is sometimes the case that the driver is not performing a brake manipulation. At that time point of "NO" at S20, it is determined whether or not the brake is actuated by the driver's brake manipulation (S24).

If the brake actuation is not absent (NO at S24), there is no need for brake control executed by the brake ECU 70. The hybrid ECU 7 performs a restart control of the engine 2 (S26). On the other hand, if the brake actuation is absent (YES at S24), the startup of the engine 2 sometimes causes vibration of the vehicle; therefore, the hybrid ECU 7 turns on the actuation of the brake (S28) by controlling the brake ECU 70 so that braking force is applied to the wheels when the engine 2 is started. Then, the restart control of the engine 2 is performed (S26). Therefore, in the case where the vehicle is at a stop when the vehicle run position is not selected, the vibration of the vehicle 1 at the time of starting the engine 2 can be restrained.

Figure 3:
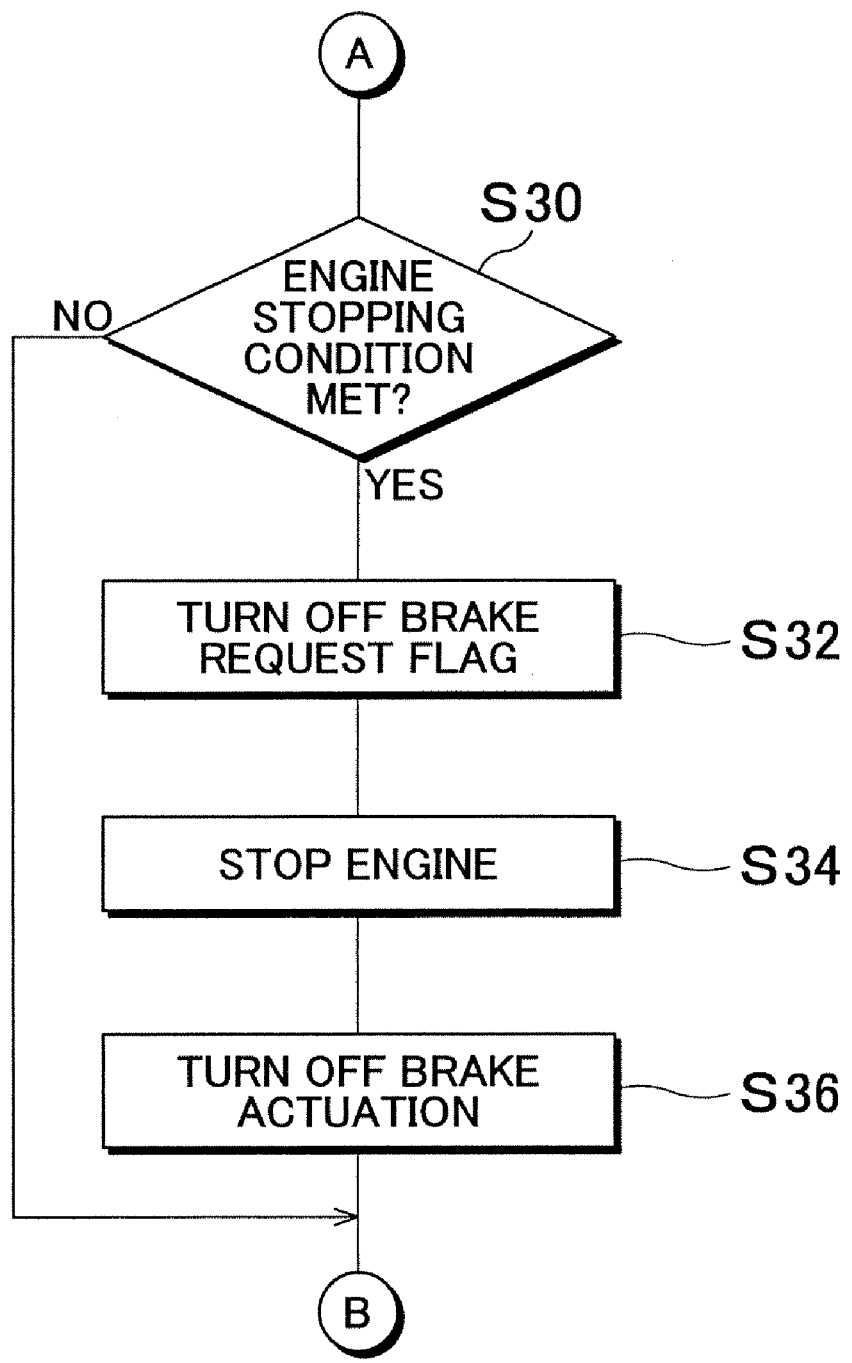
FIG. 3 is a flowchart illustrating the brake actuation control in accordance with the first embodiment.

FIG. 3 is another flowchart illustrating the brake actuation control in accordance with the first embodiment. With reference to FIG. 3, the brake actuation control performed at the time of stopping the restarted engine 2 will be described.

If at S12 shown in FIG. 2 it is determined that the engine 2 is not stopped (NO at S12), the hybrid ECU 7 determines whether or not a condition for stopping the engine 2 is met (S30) on the basis of a result obtained at S10 by processing various input signals that indicate states of the vehicle. In this embodiment, the hybrid ECU 7 determines whether or not the state of charge of the battery 12 is greater than or equal to a predetermined control value. Specifically, the hybrid ECU 7 detects the SOC value indicating the state of charge, and, on the basis of the information, determines whether or not to stop the engine 2.

If the SOC value is less than a predetermined control value, it is determined that the condition for stopping the engine 2 is not met (NO at S30), and then various input signals indicating states of the vehicle are read in again (S10). On the other hand, if the SOC value is greater than or equal to the predetermined control value, there is no need to cause the motor generator 4 to generate electricity in order to charge the battery 12. In this case, since the engine 2 does not need to be driven in order provide power for the motor generator 4, it is determined that the condition for stopping the engine 2 has been met (YES at S30).

Since vibration of the vehicle can occur at the time of stopping the vehicle, it is not preferable that the brake actuation be turned off before the engine 2 stops if the condition for stopping the engine 2 is met. Therefore, firstly, the hybrid ECU 7 turns off the brake request flag (S32), and transmits the information to the brake ECU 70. Then, the engine 2 is stopped (S34), and then the brake actuation is turned off (S36). Therefore, in the case where the vehicle is at a stop when the vehicle run position is not selected, the vibration of the vehicle 1 at the time of stopping the engine 2 can be restrained.

Figure 4:
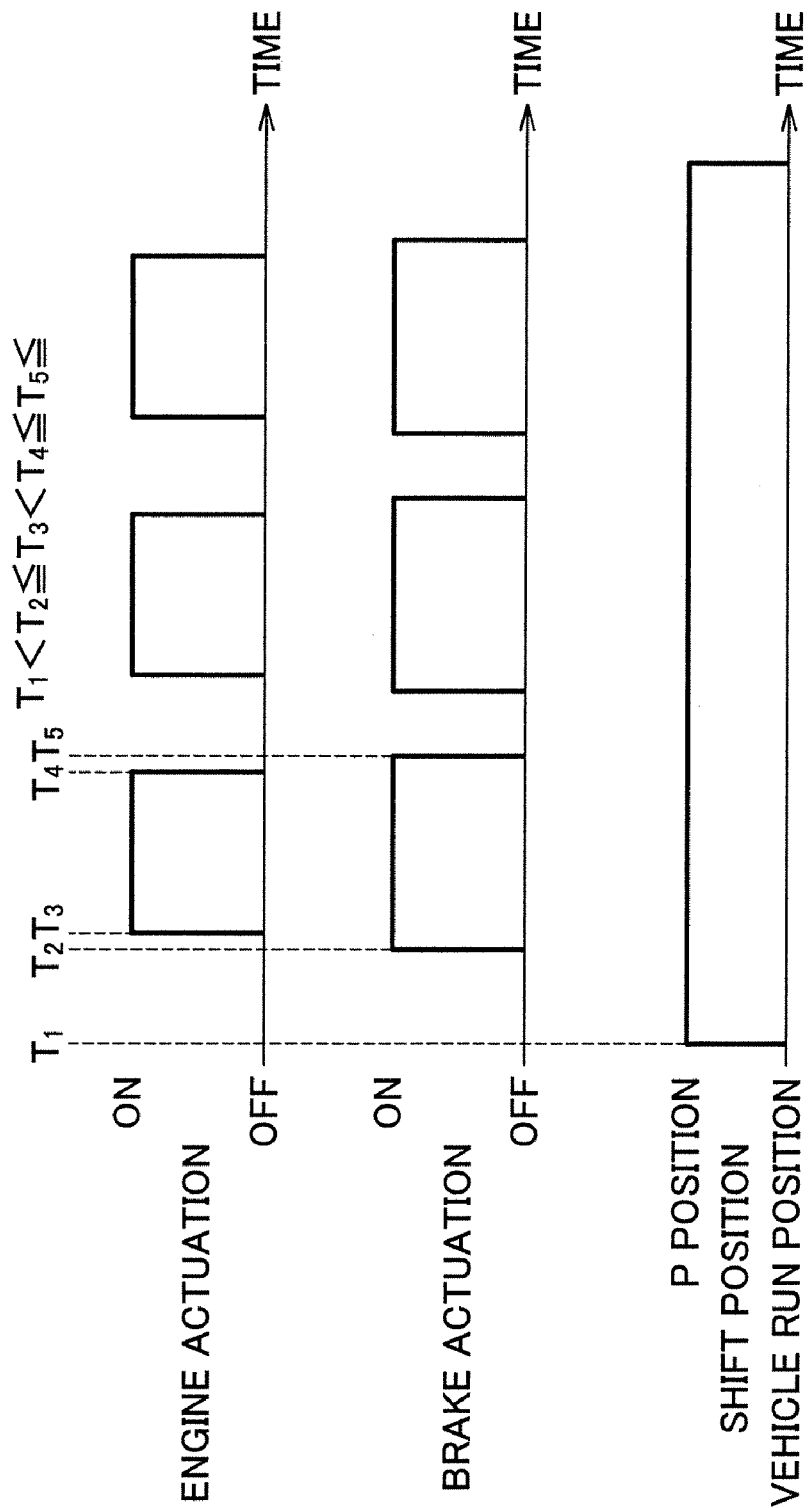
FIG. 4 is a timing chart of the engine actuation, the brake actuation, and the shift position in accordance with the first embodiment.

FIG. 4 is a timing chart of the engine actuation, the brake actuation, and the shift position in accordance with the first embodiment.

As shown in FIG. 4, the vehicle control apparatus 100 in accordance with this embodiment is capable of restraining the vibration of the vehicle 1 at the time of starting the engine 2 by turning on the brake actuation at a time T2 that is prior to a time T3 at which the engine actuation is turned on as the engine restart condition is met after the P position, not a vehicle run position, is selected as a shift position at a time T1 following the stopping of the vehicle, through the processes shown in FIGS. 2 and 3. Furthermore, the vibration of the vehicle 1 at the time of stopping the engine can be restrained by turning off the brake actuation at a time T5 following a time T4 at which the engine actuation becomes off.

Second Embodiment

Figure 5:
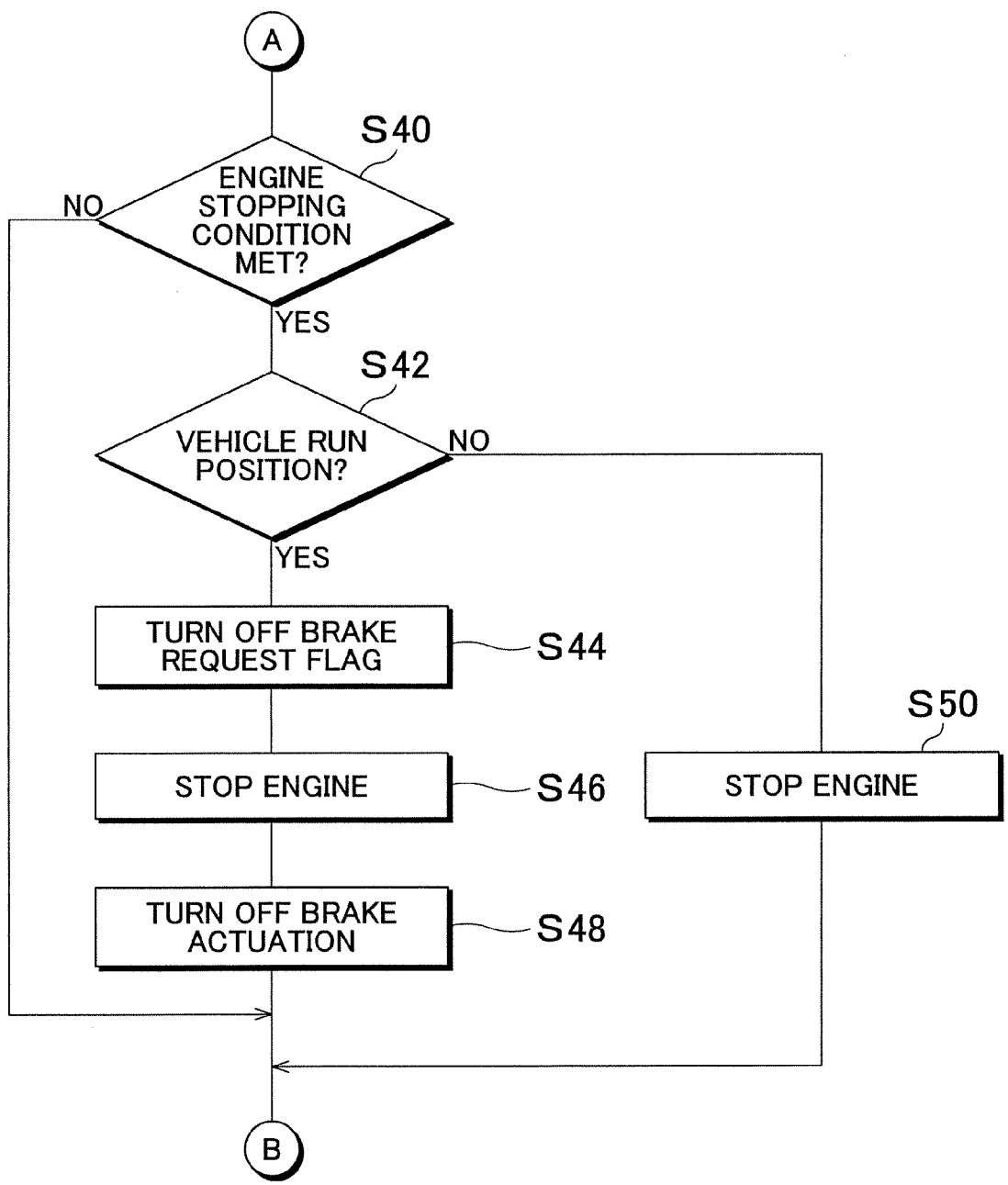
FIG. 5 is a flowchart illustrating a brake actuation control in accordance with a second embodiment.

FIG. 5 is a flowchart illustrating a brake actuation control in accordance with a second embodiment. With reference to FIG. 5, the brake actuation control performed when the restarted engine 2 is stopped will be described.

If it is determined at S12 in FIG. 12 that the engine 2 is not stopped (NO at S12), the hybrid ECU 7 determines whether or not a condition for stopping the engine 2 is met (S40), on the basis of a result obtained at S10 by processing various input signals that indicate states of the vehicle. In this embodiment, it is determined whether or not the state of charge of the battery 12 is greater than or equal to a predetermined control value. Specifically, the SOC value indicating the state of charge is detected. On the basis of the information, the hybrid ECU 7 determines whether or not to stop the engine 2.

If the SOC value is less than the predetermined control value, it is determined that the condition for stopping the engine 2 is not met (NO at S40), and various input signals indicating states of the vehicle are read in (S10). On the other hand, if the SOC value is greater than or equal to the predetermined control value, there is no need to cause the motor generator 4 to generate electricity in order to charge the battery 12. In this case, since the engine 2 does not need to be driven in order provide power for the motor generator 4, it is determined that the condition for stopping the engine 2 has been met (YES at S40).

Next, it is determined (S42) whether or not the vehicle run position has been selected, on the basis of information regarding the shift position detected by the parking brake switch 72 and the shift position sensor 74. If a vehicle run position, not the P position, has been selected (YES at S42), it is expected that the vehicle will later be run, and there is no need to consider the vibration of the vehicle that may be caused at the time of restarting the engine 2, and there is a need to turn off the brake actuation. Therefore, the hybrid ECU 7 turns off the brake request flag (S44), and transmits the information to the brake ECU 70. Then, the engine 2 is stopped (S46). After that, the brake actuation is turned off (S48).

On the other hand, if the P position, which is not a vehicle run position, has been selected, it is expected that the stop of the vehicle 1 will continue and the restarting and stopping of the engine 2 will be repeatedly performed. In the first embodiment, if a predetermined condition for restarting or stopping the engine 2 is met a plurality of times, the action of applying braking force to the wheel via a braking device is performed a plurality of times. Every time the action is performed, actuation sounds are produced from movable portions, such as a valve, a pump, etc., which constitute the brake, that is, a braking device.

Therefore, in this embodiment, if the P position, which is not a vehicle run position, has been selected (NO at S42), the hybrid ECU 7 stops the engine 2 while controlling the brake ECU 70 so that the braking force applied to the wheels is maintained without turning off the brake actuation during that period (S50). This will reduce the frequency of the brake action of applying braking force to the wheels in conjunction with the turning on and off of the brake actuation. Therefore, the occurrence of actuation sounds will be restrained so that quietness will improve, and the abrasion and sliding of movable portions will reduce so that the service life of the brake will increase.

Figure 6:
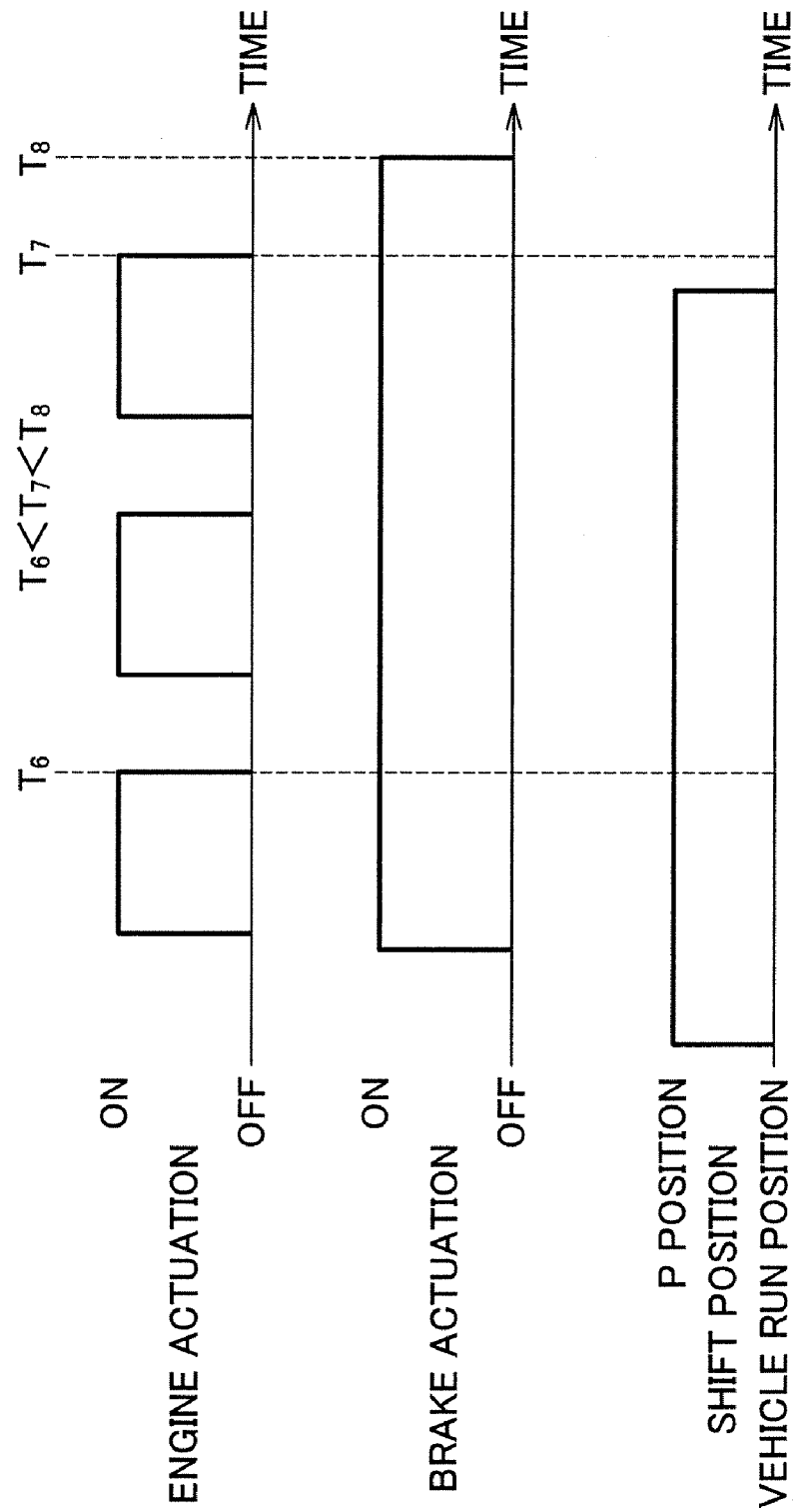
FIG. 6 is a timing chart of the engine actuation, the brake actuation, and the shift position in accordance with the second embodiment.

FIG. 6 is a timing chart of the engine actuation, the brake actuation, and the shift position in accordance with the second embodiment.

As shown in FIG. 6, when the shift position is the P position (time T6) in a case where the engine 2 is about to be stopped as the engine 2 in operation meets the engine stopping condition after the vehicle is stopped, the vehicle control apparatus 100 in accordance with this embodiment maintains the existing brake actuation on-state in which braking force is applied to the wheels, through the processes shown in FIGS. 2 and 5. This will reduce the frequency of the brake action of applying braking force to the wheels in conjunction with the turning on and off of the brake actuation.

Furthermore, when the shift position is a vehicle run position (time T7) in the case where the engine 2 is about to be stopped as the engine 2 in operation meets the engine stopping condition after the vehicle is stopped, the vehicle control apparatus 100 changes the brake actuation on-state where braking force is applied to the wheels into the off-state at a time T8 after the engine 2 is stopped.

Third Embodiment

Figure 7:
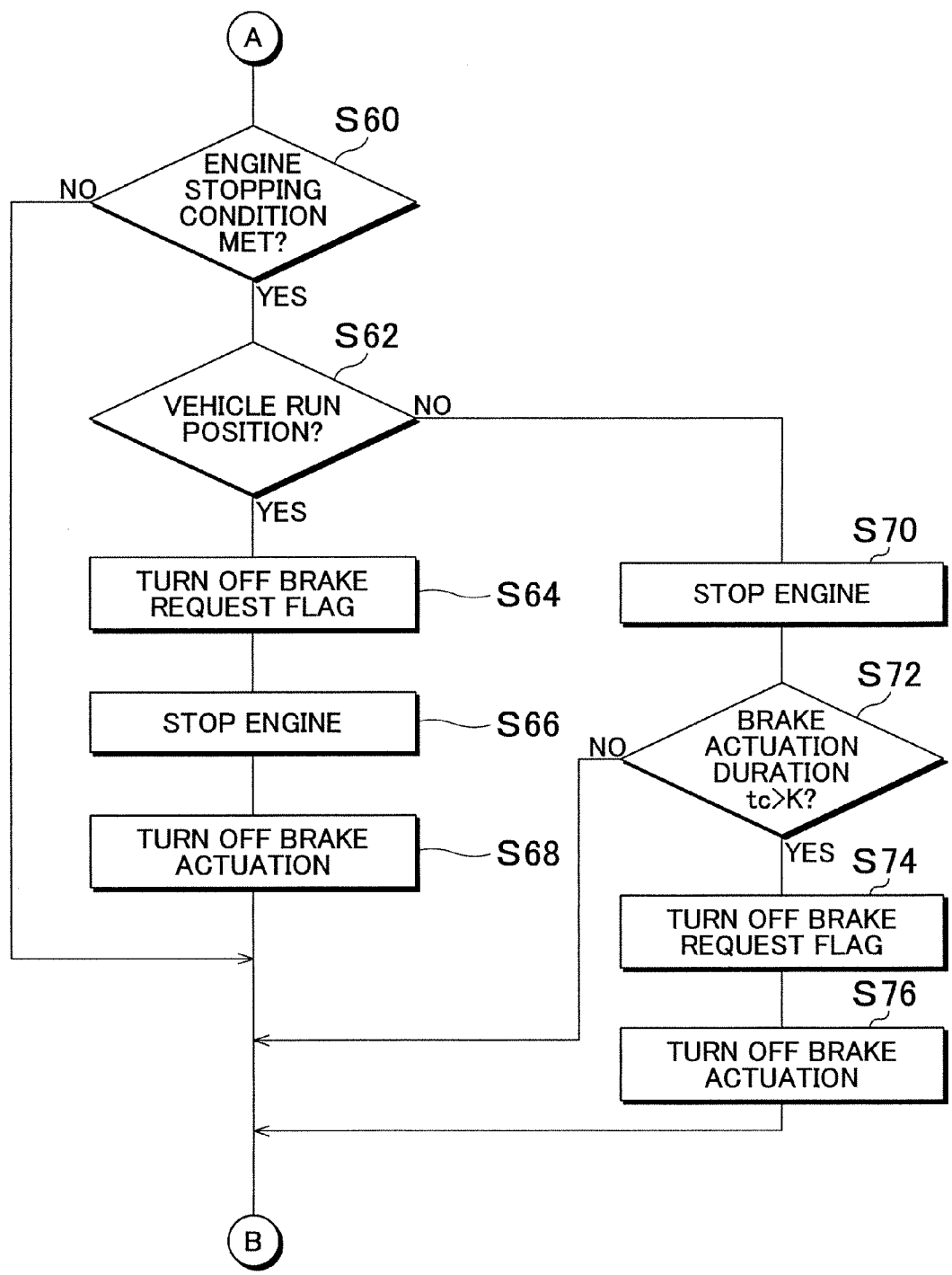
FIG. 7 is a flowchart illustrating a brake actuation control in accordance with a third embodiment.

FIG. 7 is a flowchart illustrating a brake actuation control in accordance with the third embodiment. With reference to FIG. 7, the brake actuation control performed when the restarted engine 2 stops. Incidentally, contents of the third embodiment that overlap with those of the first embodiment or the second embodiment will not be described in detail again.

If at S12 in FIG. 2 it is determined that the engine 2 is not stopped (NO at S12), the hybrid ECU 7 determines whether or not a condition for stopping the engine 2 is met (S60), on the basis of a result obtained at S10 by processing various input signals that indicate states of the vehicle. In this embodiment, the hybrid ECU 7 determines whether or not the state of charge of the battery 12 is greater than or equal to a predetermined control value.

If the SOC value is less than the predetermined control value, it is determined that the condition for stopping the engine 2 is not met (NO at S60), and various input signals indicating states of the vehicle are read in again (S10). On the other hand, if the SOC value is greater than or equal to the predetermined control value, there is no need to cause the motor generator 4 to generate electricity in order to charge the battery 12. In this case, since the engine 2 does not need to be driven in order provide power for the motor generator 4, it is determined that the condition for stopping the engine 2 has been met (YES at S60).

Next, it is determined (S62) whether or not the vehicle run position has been selected, on the basis of information regarding the shift position detected by the parking brake switch 72 and the shift position sensor 74. If a vehicle run position, not the P position, has been selected (YES at S62), it is expected that the vehicle will later be run, and there is no need to consider the vibration of the vehicle that may be caused at the time of restarting the engine 2, and there is a need to turn off the brake actuation. Therefore, the hybrid ECU 7 turns off the brake request flag (S64), and transmits the information to the brake ECU 70. Then, the engine 2 is stopped (S66). After that, the brake actuation is turned off (S68).

On the other hand, if the P position, not a vehicle run position, has been selected (NO at S62), the hybrid ECU 7 stops the engine 2 while controlling the brake ECU 70 so that the braking force applied to the wheels is maintained without turning off the brake actuation during that period (S70). This will reduce the frequency of the brake action of applying braking force to the wheels in conjunction with the turning on and off of the brake actuation. Therefore, the occurrence of actuation sounds will be restrained so that quietness will improve, and the abrasion and sliding of movable portions will reduce so that the service life of the brake will increase.

If during the period when the vehicle run position is not selected, the time during which the braking force is maintained exceeds a predetermined time, the hybrid ECU 7 in accordance with the embodiment controls the brake ECU 70 so that the braking force is removed. Some oil pressure brakes and the like used as a braking device employ a valve whose open or closed state is maintained by electrification. As for such a brake, an event can be assumed in which if braking force continues to be applied to the wheel, the overheating of the valve results due to the current continuously flowing through the valve. However, in this embodiment, if during the period when the vehicle run position is not selected, the time during which braking force is maintained exceeds a predetermined time, the overheating of the valve can be restrained by removing the braking force.

Concretely, it is determined whether or not a brake actuation on-state duration time tc has exceeded a predetermined time K (S72). If tc≦K (NO at S72), the brake actuation on-state is continued. On the other hand, if tc>K (YES at S72), the hybrid ECU 7 turns off the brake request flag (S74), and transmits the information to the brake ECU 70. Then, the brake actuation is turned off (S76).

FIG. 8 is a timing chart of the engine actuation, the brake actuation, and the shift position in accordance with the third embodiment.

As shown in FIG. 8, when the shift position is the P position (time T10) in a case where the engine 2 is about to be stopped as the engine 2 in operation meets the engine stopping condition after the vehicle is stopped, the vehicle control apparatus 100 in accordance with this embodiment maintains the brake actuation on-state if the brake actuation on-state duration tc1 (=T10−T9) during which the braking force is applied to the wheels is less than or equal to the predetermined time K, through the processes shown in FIGS. 2 and 7.

However, if the brake actuation on-state duration tc1 (=T11−T9) during which the braking force is applied to the wheels is longer than the predetermined time K when the shift position is the P position (time T11) in a case where the engine is about to be stopped as the engine 2 in operation meets the engine stopping condition after the vehicle is stopped, the vehicle control apparatus 100 changes the state of brake actuation to the off-state. This avoids the continuous electrification of an electromagnetic valve in a brake actuator which lasts for a predetermined time or longer. Therefore, the failures due to overheating will reduce, and the service life will increase.

It is also recommendable that the timing at which the braking force by the brake is removed be within a period when the engine 2 is stopped. Therefore, since braking force is not removed during the period when the engine 2 is driven, the occurrence of vibration of the vehicle caused by the driving of the engine 2 can be restrained.

Fourth Embodiment

While in the foregoing embodiments the oil pressure brake is used to apply braking force to the wheels, the hybrid ECU 7 in the fourth embodiment does not perform the control of applying braking force to the wheels via the oil pressure brake at the time of starting the engine 2 if braking force has been applied to wheels via a device other than the oil pressure brake, for example, a parking brake.

For example, if braking force has been applied to the wheels by using an electric or manual parking brake instead of or together with the oil pressure brake, braking force is not additionally applied by the oil pressure brake. Therefore, the actuation sounds produced from movable portions at the time of actuation of the oil pressure brake will reduce, and the abrasion and sliding of movable portions will reduce so that the service life of the oil pressure brake will increase.

Concretely, on the basis of information detected by the parking brake switch 72, the brake ECU 70 determines whether the on/off-state of actuation of the parking brake. If the parking brake is in the on-state, the brake ECU 70 changes the actuation state of the oil pressure brake from the on-state to the off-state. Or, the actuation off-state of the oil pressure brake is not changed to the on-state. Incidentally, the parking brake switch 72 in accordance with one of the first to forth embodiments is used for determination whether the on/off-state of actuation of the parking brake in addition to detection whether or not the parking position has been selected as a shift position of the transmission. However, the parking brake switch 72 can be used only for detection whether or not the parking position has been selected as a shift position of the transmission, or only for determination whether the on/off-state of actuation of the parking brake. In a case where the shift position is not detected by using the parking brake switch 72, the shift position can be detected only by the shift position sensor.

The invention has been described above with reference to preferred embodiments. These embodiments are merely illustrative, however, and it should be apparent to those with ordinary skill in the art that various modifications are possible with regard to component elements, combinations of processes, and that such modifications are also within the scope of the invention as defined by the claims.

What is claimed is:

1. A vehicle control apparatus comprising:
a drive source for producing a drive force;
a braking device that applies a braking force to a wheel of the vehicle;
a transmission having a plurality of shift positions including a vehicle run position in which a drive force is applied to the wheel and a vehicle non-run position in which a drive force is not applied to the wheel;
a drive source control device that automatically stops and starts the drive source when a predetermined condition is met while the vehicle is stopped; and
a braking force control device that controls the braking device to apply a braking force to the wheel while the vehicle is stopped,
wherein the braking force control device controls the braking device to apply a braking force to the wheel when the drive source is automatically started by the drive source control device, and a parking mode of the transmission is selected while the vehicle is stopped.

2. The vehicle control apparatus according to claim 1, wherein the braking force control device controls the braking device so that the braking force applied to the wheel when the drive source is started is maintained during a period when the vehicle non-run position is selected.

3. The vehicle control apparatus according to claim 1, wherein the braking force control device controls the braking device so that the braking force is removed when a time during which the braking force is maintained exceeds a predetermined time during the period when the vehicle non-run position is selected.

4. The vehicle control apparatus according to claim 3, wherein a timing of removal of the braking force is in a period when the drive source is stopped.

5. The vehicle control apparatus according to claim 1, wherein the braking force control device controls the braking device so as to maintain the braking force applied to the wheel until after a time at which the drive source is again stopped, when the vehicle non-run position of the transmission is selected while the vehicle is stopped.

6. The vehicle control apparatus according to claim 1, wherein when the braking force has been applied to the wheel by a braking device other than an oil pressure brake, the braking force control device does not perform a control of applying a braking force to the wheel via the oil pressure brake when the driving source is started.

7. The vehicle control apparatus according to claim 1, wherein the braking device includes a hydraulic braking unit and at least one other braking device for applying a braking force to the wheel, and wherein the braking force control device controls the hydraulic braking unit so as to apply a braking force to the wheel when the drive source is started, only when the at least one other braking device is not actuated.

8. A vehicle control method for controlling operation of a vehicle having a drive source for producing a drive force, a braking device for applying a braking force to a wheel of the vehicle, and a transmission having a plurality of shift positions including a vehicle run position in which a drive force is applied to the wheel and a vehicle non-run position in which a drive force is not applied to the wheel, comprising the steps of:
automatically stopping and starting the drive source with a drive source control device when a predetermined condition is met while the vehicle is stopped; and
controlling the braking device to apply a braking force to the wheel when the drive source is automatically started by the drive control device, and a parking mode of the transmission is selected while the vehicle is stopped.

9. The vehicle control method according to claim 6, wherein the braking force applied to the wheel when the drive source is started is maintained during a period when the vehicle non-run position is selected.

10. The vehicle control method according to claim 8, wherein the braking force is removed when a time during which the braking force is maintained exceeds a predetermined time during the period when the vehicle non-run position is selected.

11. The vehicle control method according to claim 10, wherein a timing of removal of the braking force is in a period when the drive source is stopped.

12. The vehicle control method according to claim 8, wherein the braking force applied to the wheel is maintained until after a time at which the drive source is again stopped, when the vehicle non-run position of the transmission is selected while the vehicle is stopped.

13. The vehicle control method according to claim 8, wherein when the braking force has been applied to the wheel by a braking device other than an oil pressure brake, a control of applying a braking force to the wheel via the oil pressure brake is not performed when the driving source is started.

14. The vehicle control method according to claim 8, wherein the braking device includes a hydraulic braking unit and a least one other braking device for applying a braking force to the wheel, and wherein the hydraulic braking unit is controlled so as to apply a braking force to the wheel when the drive source is started, only when the at least one other braking device is not actuated.

15. A vehicle control apparatus comprising:
a drive source control device that automatically stops and starts a drive source when a predetermined condition is met while the vehicle is stopped; and
a braking force control device that controls a braking force applied to a wheel,
wherein the drive source control device controls the braking force control device so that the braking force is applied to the wheel when the drive source is automatically started by the drive source control device, and a parking mode of a transmission is selected while the vehicle is stopped.

16. The vehicle control apparatus according to claim 1, wherein the vehicle is a hybrid vehicle.

17. The vehicle control method according to claim 8, wherein the vehicle is a hybrid vehicle.

18. The vehicle control apparatus according to claim 15, wherein the vehicle is a hybrid vehicle.

19. The vehicle control apparatus according to claim 1, wherein the braking force control device controls the braking device to apply the braking force to the wheel when the drive source is automatically started by the drive source control device, the parking mode of the transmission is selected while the vehicle is stopped, and a braking actuation is not currently being performed.

20. The vehicle control method according to claim 8, wherein the braking device applies the braking force to the wheel when the drive source is automatically started by the drive control device, the parking mode of the transmission is selected while the vehicle is stopped, and a braking actuation is not currently being performed.

21. The vehicle control apparatus according to claim 15, wherein the drive source control device controls the braking force control device so that the braking force is applied to the wheel when the drive source is automatically started by the drive source control device, the parking mode of the transmission is selected while the vehicle is stopped, and a braking actuation is not currently being performed.

* * * * *